United States Patent [19]
Gielow et al.

[11] Patent Number: 5,118,330
[45] Date of Patent: * Jun. 2, 1992

[54] AERODYNAMIC FILTER

[75] Inventors: Robert L. Gielow, Farmington; James C. Paul, Brighton, both of Mich.

[73] Assignee: Invent AG, Vaduz, Liechtenstein

[*] Notice: The portion of the term of this patent subsequent to Mar. 26, 2008 has been disclaimed.

[21] Appl. No.: 674,580

[22] Filed: Mar. 25, 1991

Related U.S. Application Data

[63] Continuation of Ser. No. 331,792, Apr. 3, 1989, Pat. No. 5,002,597.

[51] Int. Cl.$^5$ .............................................. B01D 46/24
[52] U.S. Cl. ........................................ 55/97; 55/486; 55/489; 55/524
[58] Field of Search ................. D23/364, 365; 55/486, 55/488, 489, 524, DIG. 13, 96, 97

[56] References Cited

U.S. PATENT DOCUMENTS

| | | | |
|---|---|---|---|
| 1,783,143 | 11/1930 | Schrempp | 55/489 X |
| 1,802,941 | 4/1931 | Drager | 55/489 |
| 3,075,333 | 1/1963 | Revell | 55/DIG. 13 X |
| 4,008,060 | 2/1977 | Andreae | 55/486 X |
| 4,178,161 | 12/1979 | Rudner et al. | 55/DIG. 13 X |
| 5,002,597 | 3/1991 | Gielow et al. | 55/486 |

Primary Examiner—Charles Hart
Attorney, Agent, or Firm—Weintraub, DuRoss & Brady

[57] ABSTRACT

The filter of the present invention continually provides the passenger compartment of a vehicle with a supply of purified air, even in the most severe environmental conditions. The filter comprises an inlet surface, an outlet surface, walls which define a plurality of passages which extend from the inlet surface to the outlet surface, and a filtration means for removing the impurities from the fluid. The filter preferably can be subdivided into a plurality of layers, including an inlet layer, an intermediate layer, an outlet layer. Each layer includes a plurality of cells, the cells having walls with a generally curvilinear shape. A plurality of the passages are preferably in fluid communication with a plurality of other passages. Surface filtration is used to remove the impurities from the fluid flowing through the passages. The impurities are retained within the filtration means which are disposed on the walls, as the fluid flows through the passages essentially unrestricted even when the removing means is saturated with impurities.

5 Claims, 6 Drawing Sheets

FIG I

AERODYNAMIC FILTER

This is a continuation of the application Ser. No. 07/331,792, filed Apr. 3, 1989 and now U.S. Pat. No. 5,002,597.

BACKGROUND OF THE INVENTION

1. Field of the Invention

The present invention relates to an aerodynamically contoured filter which removes foreign particles from a fluid, and more particularly, to a filter using surface filtration to remove contaminants from air, as air laden with particulates and aerosols is circulated through the filter.

2. Background Art

Pollutants, pollen, dust particles, and other foreign particles are often introduced in the air supply of closed rooms, such as the passenger compartments of vehicles. The problem with air pollutants in vehicles is particularly acute in high traffic densities, or in severe climates with high contents of dust, smog, fog, industrial effluents, or the like.

Many attempts have been made to remove pollutants, pollen, dust particles, and other foreign particles from the air by using filtration systems. Conventionally, filtration devices which pass the air through filter media such as mats or screens are inserted in the intake channel of the vehicle cabins to filter out these contaminants. To effectively filter out small particles, the mesh of the screen must be small. The small mesh often becomes blocked after a short period of time, and it is necessary to frequently clean or change the filter element. The small mesh also produces a pressure drop, which is the major limiting factor involved in applying a filter in the intake duct of a ventilation system for a vehicle.

PCT Application PCT/De87/00489 describes a foraminous, multi-layered filter, impregnated with glycerine. The filter includes numerous apertures, such that the apertures of one layer are offset with respect to the apertures of the adjacent layers. However, such a filter is inadequate for vehicles equipped with air conditioning, since there exists too great a pressure drop across the filter.

The problems enumerated above have prevented the application of an ultra-fine particle filter in the ventilation system of a vehicle. All vehicles are critically dependent upon an adequate supply of fresh air to enable proper defrosting and defogging. It is also imperative that people with chronic allergic and asthmatic conditions have a continual supply of fresh air in all driving environments. Accordingly, the inability to supply the vehicle cabin with an adequate supply of fresh air can be a distinct health and safety hazard.

SUMMARY OF THE INVENTION

The filter of the present invention overcomes the deficiencies in the prior art, and is designed using the principles of aerodynamics to streamline the flow of fluid therethrough.

The filter hereof is defined by a multi-layered body which comprises an inlet surface and an outlet surface, walls which define a plurality of passages which extend from the inlet surface to the outlet surface, and means for removing the impurities from the fluid.

The filter preferably can be subdivided into a plurality of layers, including an inlet layer, one or more intermediate layers, and an outlet layer. The fluid approaches the inlet layer, progresses through the intermediate layers, and departs from the filter through the outlet layer. Each layer includes a plurality of cells, having cell walls with a generally curvilinear shape. Each cell wall has a fluid inlet portion and a fluid outlet portion. The fluid outlet portion of a cell disposed on the inlet layer is in fluid communication with the fluid inlet portion of a contiguous cell disposed on the adjacent intermediate layer. The fluid outlet portion of a cell disposed on an intermediate layer is in fluid communication with the fluid inlet portion of a contiguous cell disposed on the outlet layer. The cell walls combine to define a plurality of passages, which extend from the inlet surface to the outlet surface. A plurality of the passages are preferably in fluid communication with a plurality of other passages.

The means for removing the impurities from the fluid flowing through the passages is disposed along the walls. The impurities are retained within the removing means, as the removing means enable fluid to flow through the passages essentially unrestricted even when the removing means is saturated with impurities. The removing means is a surface filtration media which may be either wet or dry. If the media is wet, it is preferred that an open-faced foam be used, such as polyurethane, which is commonly impregnated with a non-toxic, non-reactive viscous solution. The wet media treats the incoming fluid that is heavily laden with dust particles, pollutants, pollen, and other foreign particles. If the media is dry, charged fibers are affixed to the side walls of the filter. The airborne particles are attracted to the surface of the fiber, and are trapped by a magnetic-like action the the fiber.

For a more complete understanding of the aerodynamic filter of the present invention, reference is made to the following detailed description and accompanying drawings in which the presently preferred embodiment of the invention is illustrated by way of example. It is expressly understood, however, that the drawings are for purposes of illustration and description only, and are not intended as a definition of the limits of the invention. Throughout the following description and drawings, identical reference numbers refer to the same component throughout the several views.

DETAILED DESCRIPTION OF THE PREFERRED EMBODIMENT

Figure 1:
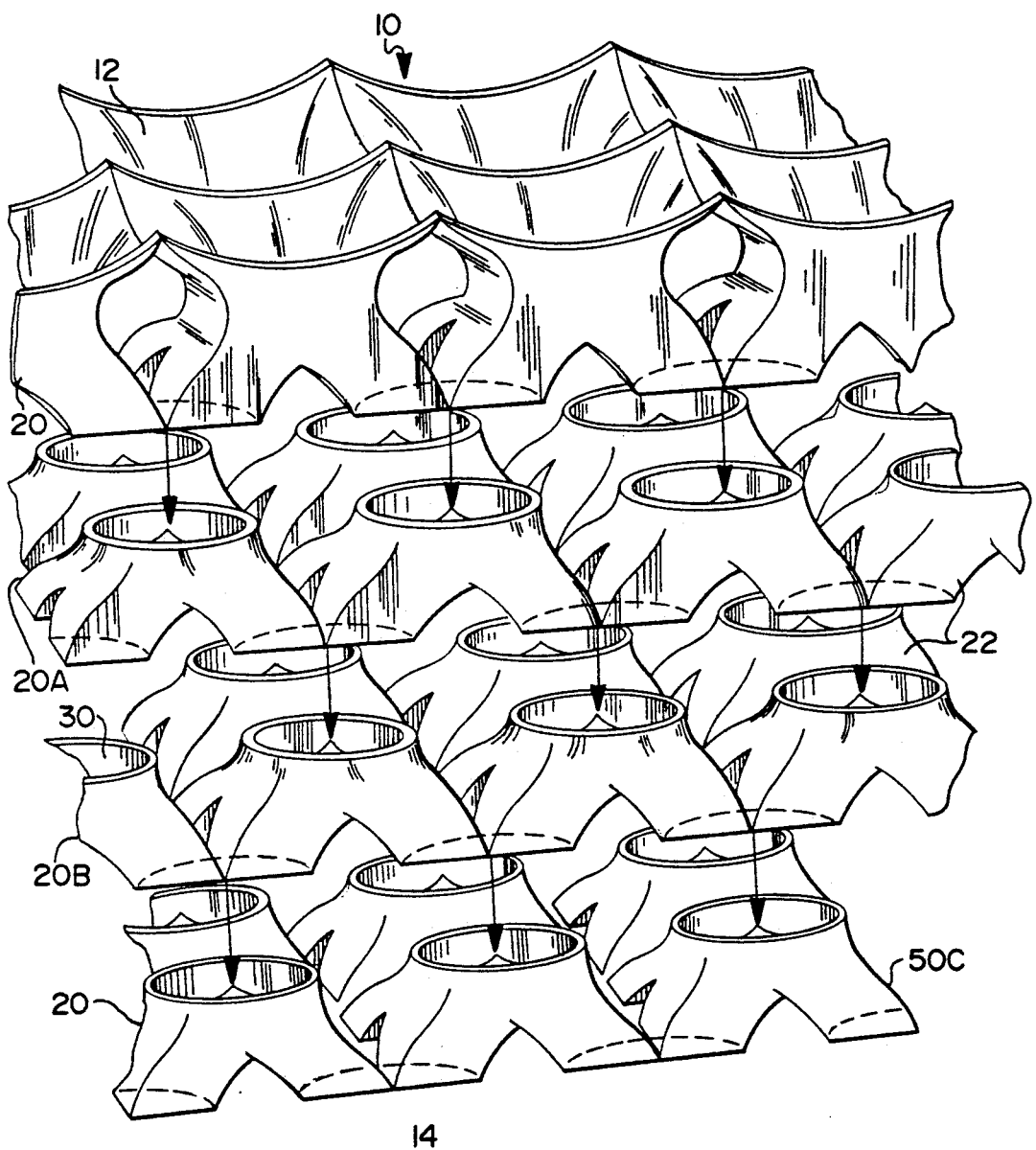
FIG. 1 is a perspective view of the filter of the present invention, depicting a plurality of cells disposed on each of a series of layers, and each layer being spaced apart from each adjacent layer to illustrate the cell structure, and the structural interrelationship between contiguous cells.

Referring now to the drawings, FIG. 1 is a perspective view of the filter 10 of the present invention. The filter 10 is preferably an open-celled foam material, such as foamed polyethylene, polyurethane, or the like. The filter 10 comprises an inlet surface 12 and an outlet surface 14, walls 30 which define a plurality of passages 40 extend from the inlet surface 12 to the outlet surface 14, and filtration means 60 for removing the impurities from the fluid.

Figure 8:
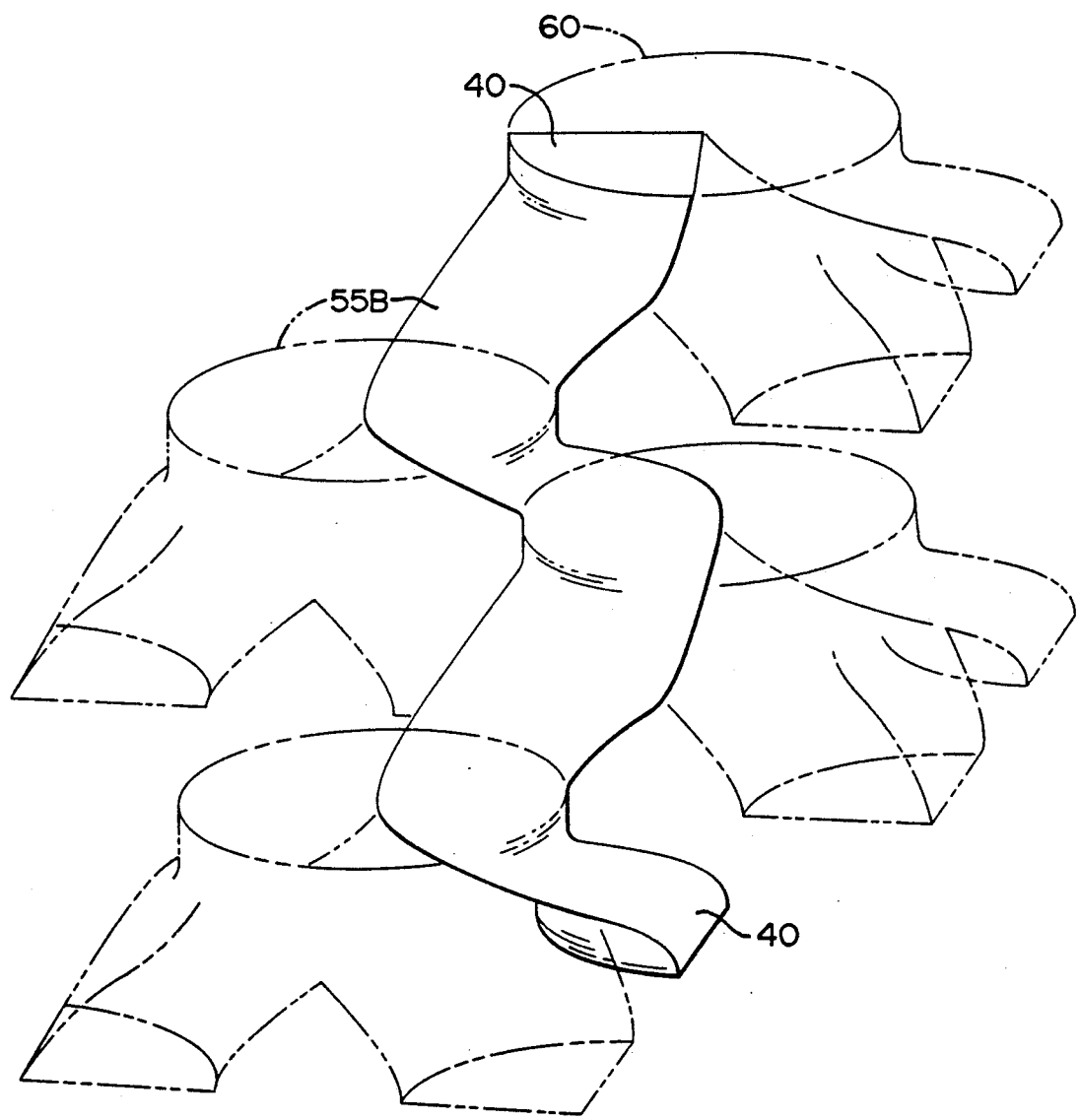
FIG. 8 is a computer-generated skeletal perspective view of a portion of the filter of FIG. 1, depicting four cells each being disposed upon four adjacent layers, the fluid passage being highlighted for purposes of illustration.

The inlet surface 12, walls 30, and a plurality of protruding members 70 which extend into the passages 40, are preferably areodynamically designed and contoured to streamline the flow of the fluid through the filter 10. The walls 30 define a labryinth of curvilinear passages 40, each passage 40 extending from the inlet surface 12 to the outlet surface 14. Each passage 40A is in fluid communication with a series of other curvilinear passages 40B. Each passage 40 has a generally symmetrical configuration. Fluid entering each passage 40A is routed into a series of adjacent passages 40B, and the fluid in passages 40A is rejoined by fluid from other adjacent passages 40B (see FIG. 8). Although the diameter of the walls 30 vary throughout the passages 40, the surface area about the passages 40 remains substantially the same throughout the length of the passages 40.

Figure 4:
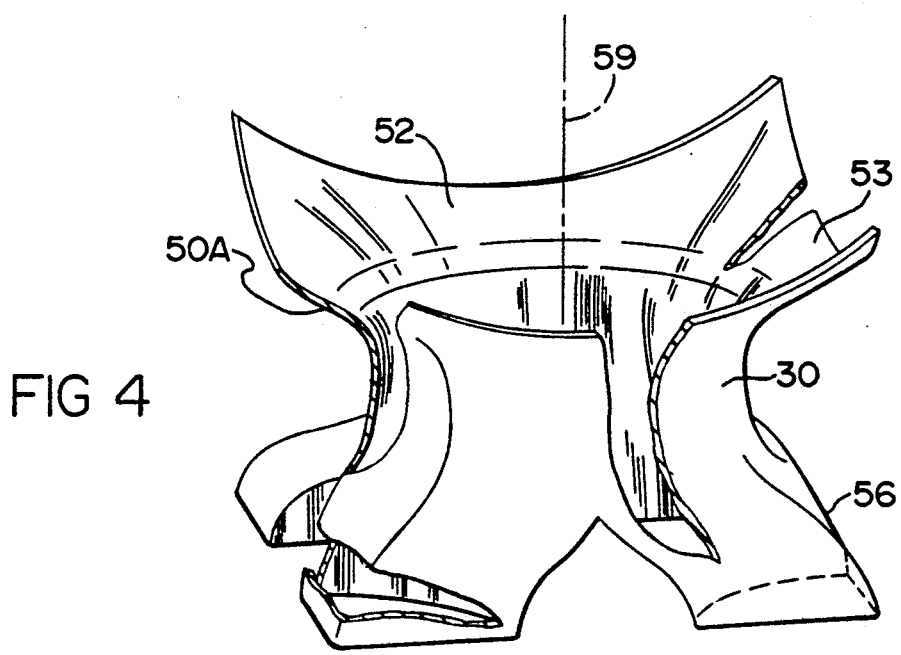
FIG. 4 is a perspective view of a partially-sectioned cell disposed on the inlet surface of the filter of FIG. 1.
Figure 5:
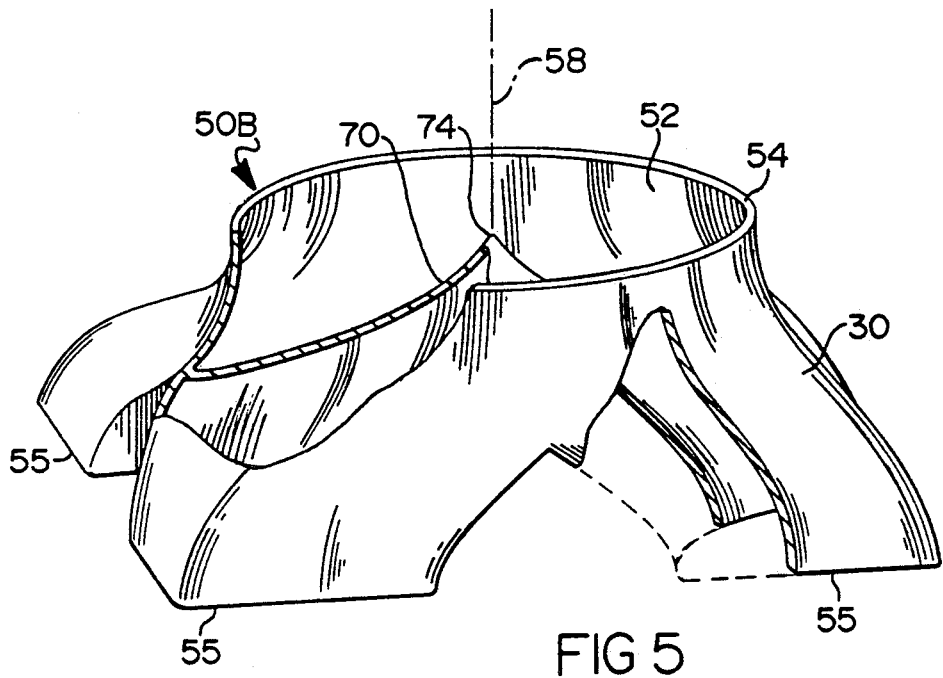
FIG. 5 is a perspective view of partially-sectioned cell of the filter of FIG. 1 is disposed on an intermediate layer.

The walls 30 surrounding the passages 40 comprise a plurality of cells 50. Each cell 50 has a chute 52 extending therethrough, which is in fluid communication with a portion of an associated cell 50 disposed on an adjacent layer 20. More particularly, and as shown in FIGS. 4 and 5, each cell 50 is defined by a toroidal portion 54 and a chute 52 integrally formed therewith. In accordance with this construction, each cell 50 is, thus, divided into a plurality of sections 55. Each section 55 is in fluid communication with a plurality of cells 50 contiguously disposed. As shown in these drawings, any one cell 50, thus, is placed in fluid communication with four cells 50, since there is depicted therein, four section 55 in association with each cell 50. It is understood that the number of sections 55 into which each cell 50 is divided is dictated by flow requirements, but optimally the cell 50 is divided into a least three and, preferably four sections 55.

The filter 10 formed from the foam material, preferably is divisible into a plurality of layers 20, including the inlet surface layer 12, at least one intermediate layer 22, and an outlet layer 14. The fluid approaches the inlet layer 12, progresses through the intermediate layer 22, and departs from the filter through the outlet layer 14.

Each cell 50 is preferably disposed along a layer 20. Each of the cells 50 on the same layer 20 are similar in shape. In the preferred embodiment of the filter 10 of the present invention, there are three basic cell configurations. A cell 50A disposed on the inlet layer 12 is depicted in FIG. 4. A cell 50B disposed on any of the intermediate layers is depicted in FIG. 5. A cell 50C disposed on the outlet layer 14 is similar to the cell depicted in FIG. 4, except that there is no protruding member 70 within the cell 50C.

The layer 20 of each cell 50 is generally normal to the axis 59 of the cell 50. The cells 50 are generally evenly spaced on each of several layers 30. In the preferred embodiment of the present invention, all of the cells 50 are disposed on four layers 20, as shown in FIG. 1.

The walls 30 of the filter 10 have a generally curvilinear shape. A cell wall 30 disposed on the inlet layer 12 has an inlet portion 53 and an outlet portion 56. The inlet portion 53 is tapered inwardly, and the outlet portion 56 is tapered outwardly. For cells 50B disposed downstream of the inlet surface 12, the inlet portion 53 is co-extensive with the outlet portion 56 of the upstream cell.

Figure 2:
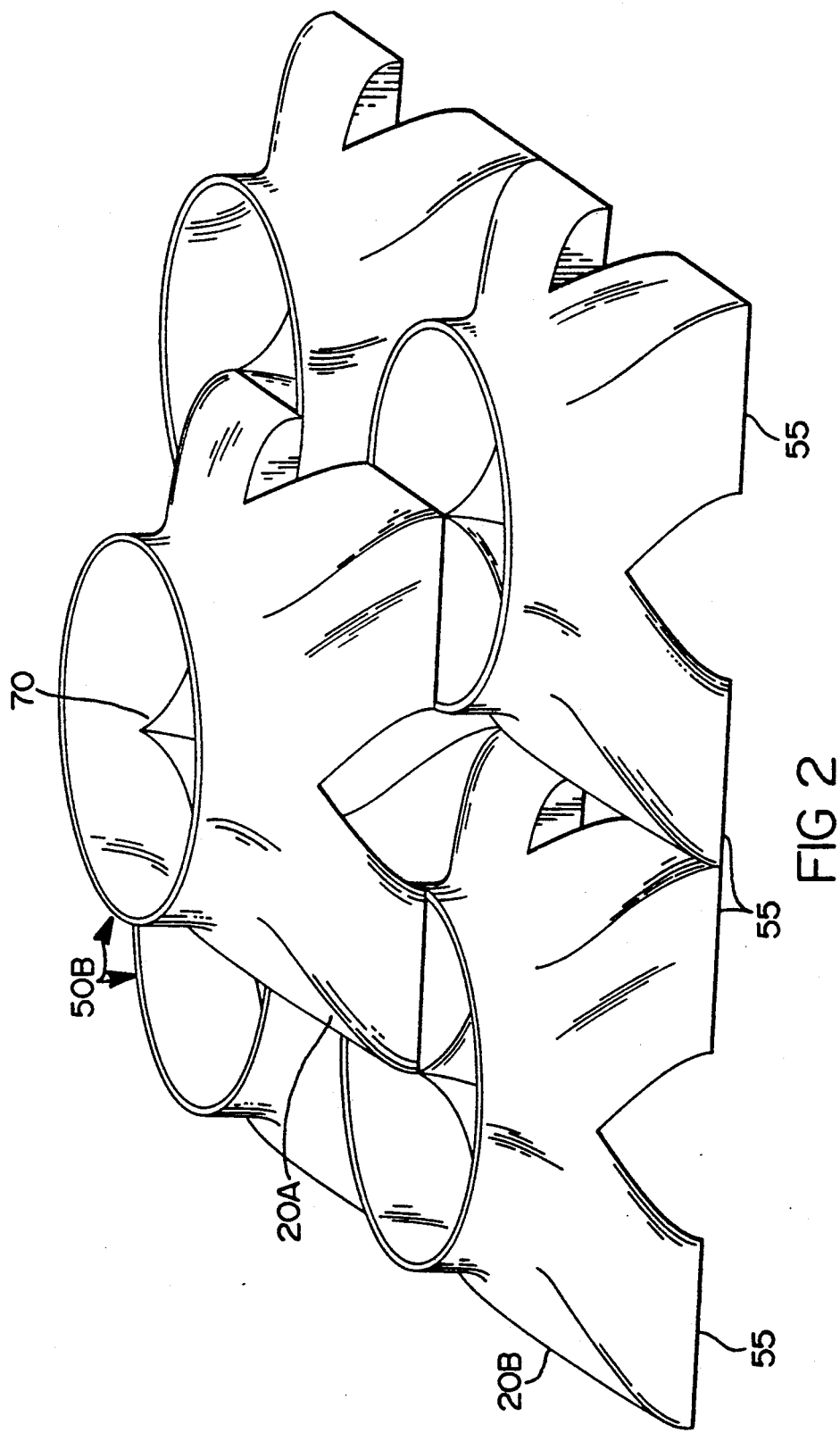
FIG. 2 is a computer-generated skeletal perspective view of a portion of the filter of FIG. 1, depicting a cell disposed on a first intermediate layer and the four cells disposed on an adjacent intermediate layer.
Figure 3:
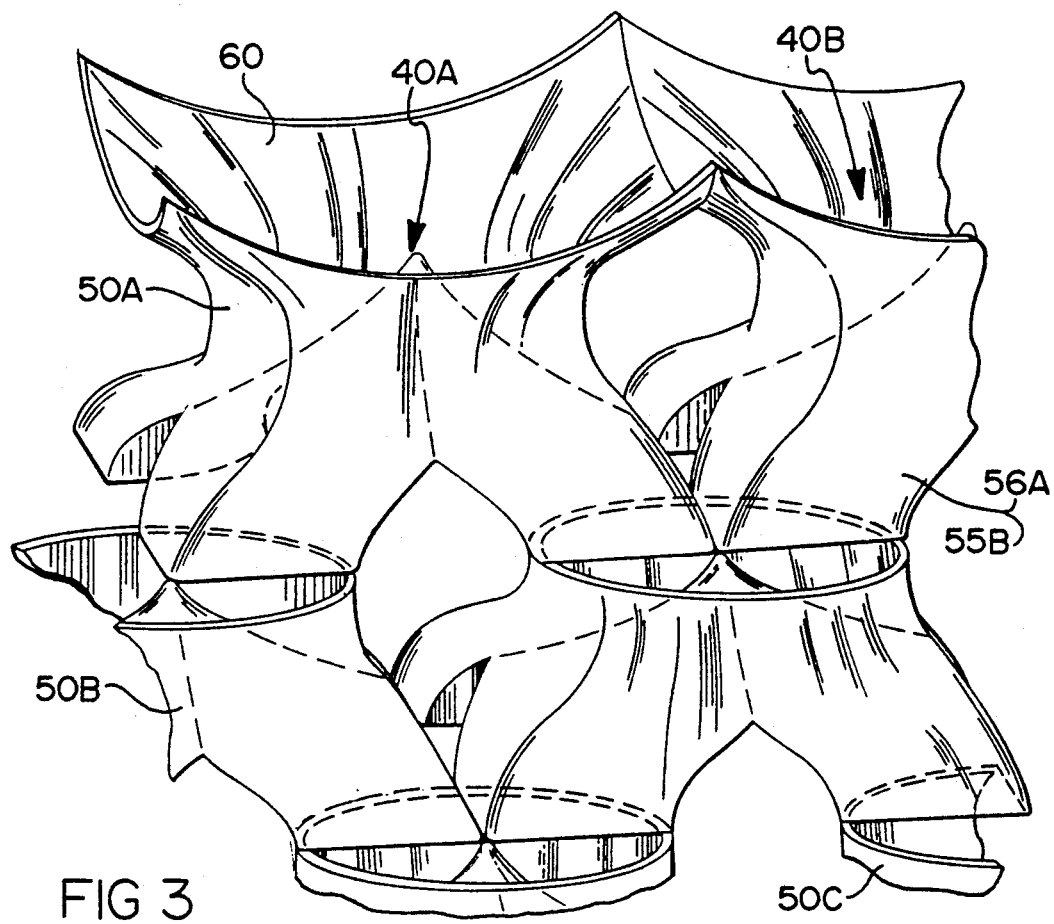
FIG. 3 is a perspective view of a portion of the filter of FIG. 1, depicting a first pair of cells disposed on the inlet surface or layer, portions of a second pair of contiguous cells aligned on a first intermediate layer, and portions of a third pair of contiguous cells aligned on a second intermediate layer.

FIG. 2 depicts a first pair of cells 50A disposed on the inlet surface 12, portions of a second pair of contiguous cells 50B aligned on a first intermediate layer 20A, and portions of a third pair of contiguous cells 50B aligned on a second intermediate layer 20B. The cells 50A disposed on the inlet surface 12 have both an inlet portion 53A and an outlet portion 56A, whereas the downstream cells have an inlet portion 55B which is coextensive with the outlet portion 56A of the upstream contiguous cell 50A. FIG. 3 depicts a cell 50A disposed on the inlet layer 12 and a contiguous cell 50B disposed on an intermediate layer 20B. Each cell 50 is in fluid communication with preferably either three, four, or six cells 50 contiguously disposed along an adjacent layer 20, although all of the drawings depict a cell 50A adjoining four contiguous cells 50B.

The filter 10 preferably has a 36% porosity and 0.35 inch layer spacing. Preferably, the filter 10 has four layers, the inlet surface layer 12, the intermediate layer 13 and the outlet surface layer; being substantially of the same thickness, and the filter 10 having a total thickness of between one and one-and-a-half inches. A chute 52 extends through each cell 50, and a central axis 59 extends through each chute 52. The axis 59 of each cell is preferably normal to the inlet surface 12 and the outlet surface 14, enabling a tangential flow of air through each of the passages 40.

Each cell 50, except for those cells 50C disposed on the outlet layer, has a contoured protruding member 70 extending therein. The protruding member 70 is generally symmetrical about the cell axis 59. The tip 74 of the protruding member 70 extends into the proximate center of the cell 50. As shown in FIG. 4, the cell wall 30 has a generally curvilinear cross-section. Since each cell 50A feeds four contiguous cells 50B, the protruding member 70 is formed by four edges 72 which divide the chute 52 into four quadrants which peak at the center of the cell 50. The protruding member 70 deflects the fluid through the outlet portion 56A of the cell 50A, and into the inlet portion 55B of the contiguous cells 50B.

Figure 7:
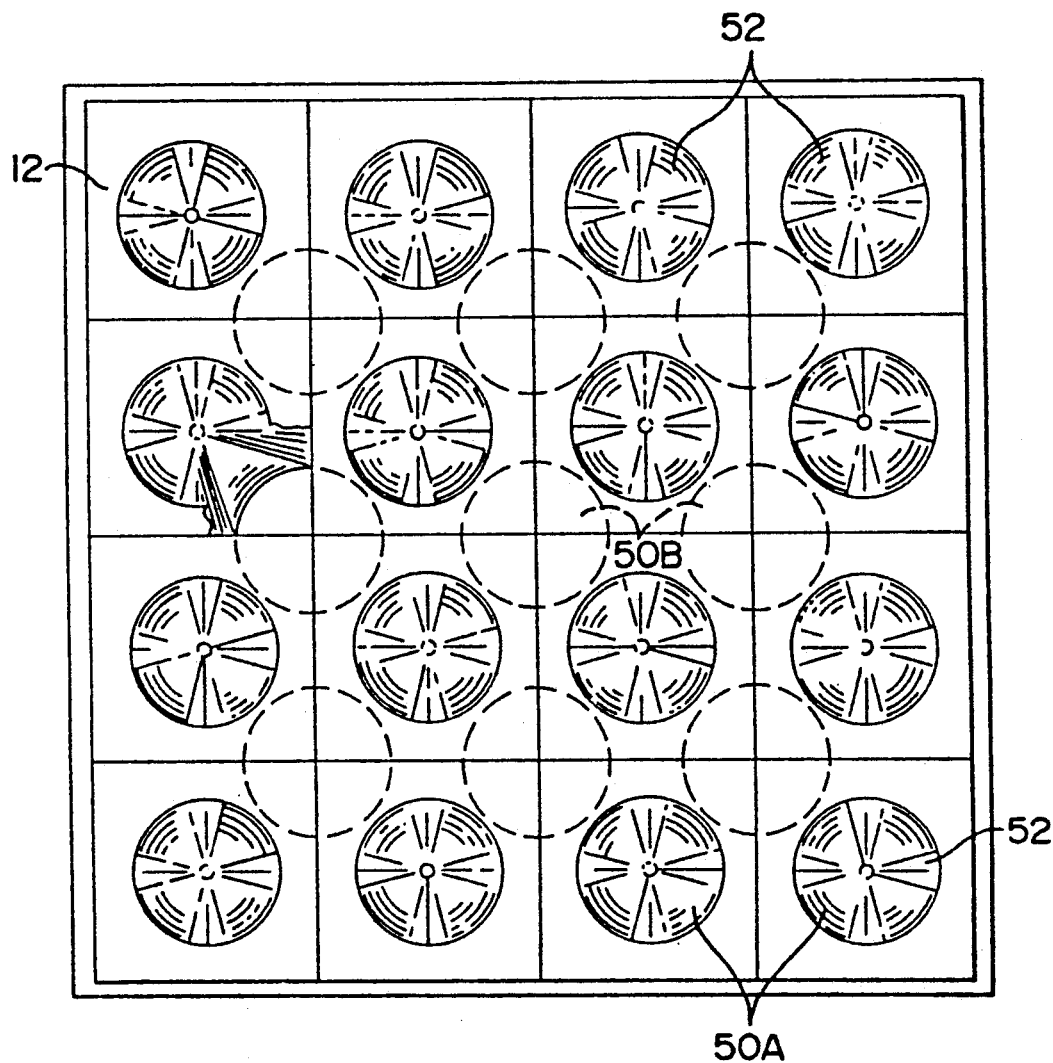
FIG. 7 is a top view of the filter of FIG. 1, the view depicting the symmetry of the top layer and the second layer, the placement of the contiguous cells on the second layer being depicted as hidden lines.

FIG. 7 is a top view of the filter 10, the view depicting the symmetry of the inlet layer 12 and an adjacent intermediate layer 20A, the placement of the contiguous cells 50 on the intermediate layer 20A being depicted as hidden lines.

The filtration means 60 for removing the impurities from the fluid flowing through the passages 40 is disposed along the walls 30. The impurities are retained within the filtration means 60, and the filtration means 60 enables fluid to flow through the passages 40 essentially unrestricted even with the filtration means 60 is saturated with impurities. The filtration means 60 is a surface filtration media which may be either wet or dry. If the media is wet, it is preferred that an open-faced foam be used, such a polyurethane, which is commonly impregnated with a non-toxic, non-reactive viscous solution. The wet media treats the incoming fluid that is heavily laden with dust particles, pollutants, pollen, and other foreign particles. If the media is dry, charged fibers are affixed to the side walls of the filtration means 60. The airborne particles are attracted to the surface of the fiber, and are trapped by a magnetic-like action to the fiber. The function of the filtration means 60 is to capture the contaminants and not allow them to rebound back into the fluid stream after striking the media.

Most of the filtration occurs between the outlet portion 56A of one cell 50 and the inlet portion 55B of a contiguous cell 50. The contoured wall 30 of cell 50 guides the flow of air into the contoured inlet portion of the contiguous cells. The air tends to cling to the contoured cell walls 30 of each cell, much as juice clings to the surface of a pitcher as it is poured therefrom. This phenomenon is well known in avionics as the Coanda Effect. Hence, the contoured cell walls 30 guide the fluid through the passages 40.

The filter 10 does not pass the fluid through the media, as "surface filtration" is more dominant than "depth filtration". The primary mechanisms involved in the filtration through the filter of the subject invention are "inertial impaction", "flowline interception", "diffusion deposition", "electrostatic deposition", and "London-van der Waals deposition", all of which are well-known phenomena to one skilled in the art.

"Inertial impaction" is caused by the fluid changing flow direction, which results in a curvature of the streamlines. The inertia of the particles prevents the particles from passing through the passages 40 unimpeded. The inertia thrusts the particles into the contoured walls 30, where the particles are deposited. The intensity of this mechanism increases with increasing particle size and increasing flow rates. Particles are also collected by "flowing interception". The particle may follow the streamline of the fluid and be collected without "inertial impaction" if the streamline is within close proximity to the collecting body.

The trajectories of individual small particles do not coincide with the streamlines of the fluid because of "Brownian motion". With decreasing particle size the intensity of "Brownian motion" increases and, as a consequence, so does the intensity of "diffusion deposition".

Aerosol particles and the fibers of a filtration media 60 generally carry electrostatic charges that considerably influence particle deposition. Charged fibers and particles influence the filtration process by altering particle trajectories and by alternating particle adherence to filter media surfaces. When the distance between a particle and the collecting body is small, deposition is influenced by London-van der Waals intermolecular forces.

If the media is wet, it is preferred that an open-faced foam be used, such as polyurethane, which is impregnated with a non-toxic, non-reactive viscous solution such as glycerine, petrolatum, grease, ethylene glycols, or edible oils. The wet media treats the incoming fluid, preferably air, that is heavily laden with dust particles, pollutants, pollen, an other foreign particles. To trap smaller particles from the fluid stream, silicon dioxide, aluminum oxide, zeolite, diatomaceous earth may be added to the viscous solution. Chemisorption masses like citric acid, tartaric acid, calcium chlordie, sodium carbonate may also be added to remove odors and harmful acidic and alkaline contaminants.

The preferred dry media is fibers which have positive and negative embedded charges. The preferred fibrous material is Filtrete$_R$, which is a registered trademark of the 3M Company. The fibrous material may be sprayed or molded onto the contoured side walls. Airborne particles under 5 microns are naturally attracted to the surface of the fiber, and are trapped by a magnetic-like action to the fiber.

Figure 6:
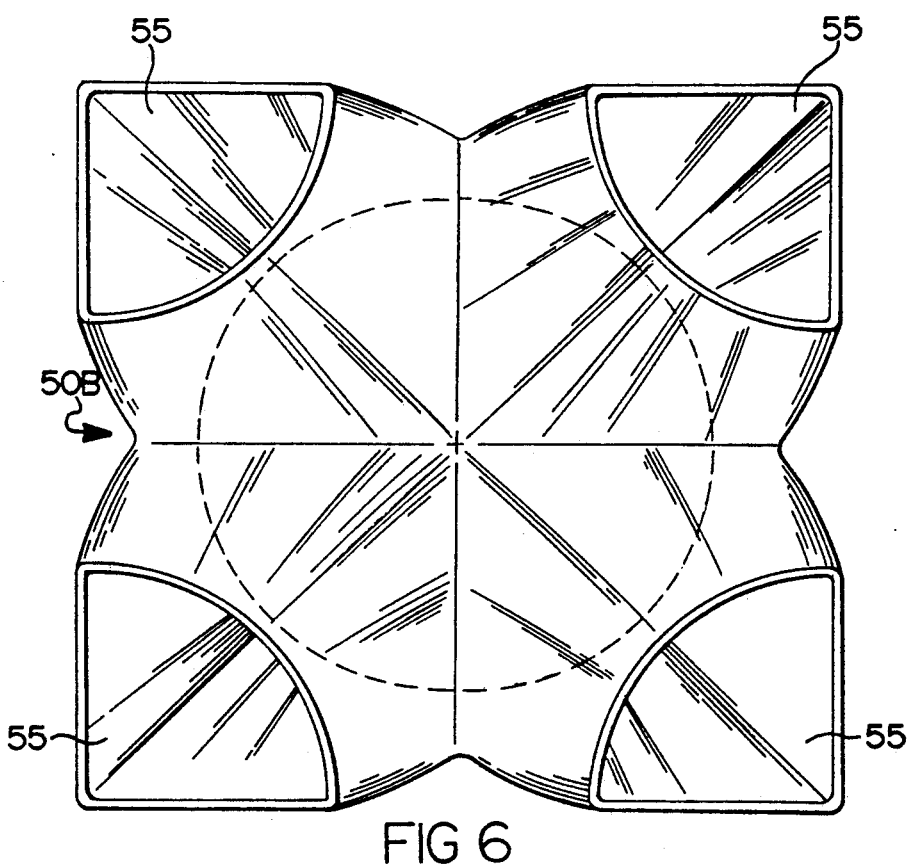
FIG. 6 is a bottom view of the cell of FIG. 5.

The filter 10 is a laminated structure, which may be precision molded, or formed by any other similar manner. The layers 20 are secured together by any of a variety of chemical adhesives that are well known in the art. The cells 50 disposed on each layer 20 would require a separate mold. Alternate layers 20A are out of phase with adjacent layers 20B (see FIG. 6), and the alternate layers can be formed by the same molds.

Typically, air approaches the filter 10 at a flow rate of about 20 to 30 feet per second, and the air leaves the filter 10 at from 50 to 70 feet per second. The pressure loss through the filter 10 is independent of the number of layers 20, but is primarily dependent upon the velocity of the air departing from the filter 10. The number of layers 20 is not limited by pressure drop, but is limited by the space for the filter 10 in the fluid line, and the duration that the filter 10 is to remain in the line until it will be replaced.

The tangential flow through the cells 50 serves to accelerate the air. Typical pressure drop through the filter 10 varies from 2 to 3 percent. The impurities are retained within the filter 10, and purified air flows out from the outlet surface 14 of the filter 10.

While the aerodynamic filter 10 has been described in conjunction with a specific embodiment, it is evident that many alternatives, modifications, and variations will be apparent to those skilled in the art in light of the disclosure herein. It is intended that all such alternatives, modifications, and variations are included herein that fall within the spirit and scope of the appended claims.

We claim:

1. A method of filtering air containing impurities comprising:
    (a) passing the air to be filtered through a filter, the filter comprising:
        (1) an inlet surface and an outlet surface, the inlet and outlet surface being separated by a distance;
        (2) a plurality of curvilinear walls, the curvilinear walls defining a plurality of fluid passages, the fluid passages extending from the inlet surface to the outlet surface; and
        (3) filtration means for removing impurities from the air flow through the passages, the impurities being retained in association with the filtration means, the filtration means enabling air to flow through the passages essentially unrestricted even when the filtration means is saturated with impurities;
    the air to be filtered passing from the inlet surface to the outlet surface thereof through passages thereof, and
    wherein the air enters the filter at a first pressure and the air departs from the filter at a second pressure, the difference between the first pressure and the second pressure defining a pressure drop, the pressure drop being essentially independent of the distance between the inlet surface and the outlet surface.

2. The method of claim 1 which further comprises: diverting a portion of the air to be filtered from one passage into another passage.

3. The method of claim 1 wherein the filter includes a plurality of layers, the air to be filtered passing through the plurality of layers.

4. The method of claim 1 wherein the filtration means is wet surface filtration means.

5. The method of claim 1 wherein the filtration means is a dry surface filtration means.

* * * * *